May 6, 1924.
B. JANCIKIN
COOKING UTENSIL
Filed March 21, 1923
1,493,459
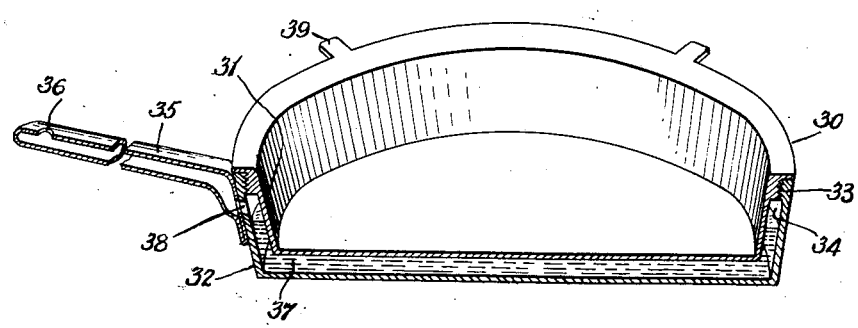
Inventor
Bozidar Jancikin
By his Attorneys
Edgar Pete & Co Patented May 6, 1924.

1,493,459

UNITED STATES PATENT OFFICE.

BOZIDAR JANCIKIN, OF RICHMOND HILL, NEW YORK.

COOKING UTENSIL.

Application filed March 21, 1923. Serial No. 626,691.

*To all whom it may concern:*

Be it known that I, BOZIDAR JANCIKIN, a citizen of Hungary, and residing at Richmond Hill, in the county of Queens and State of New York, have invented certain new and useful Improvements in Cooking Utensils, of which the following is a specification, such as will enable those skilled in the art to which it appertains to make and use the same.

This invention relates to cooking utensils, such for example as frying pans, saucepans, baking or roasting pans and other similar articles of this class, and the object of the invention consists in providing a cooking utensil of the class specified which is composed of inner and outer body members spaced apart to form a chamber, which is closed at the top of the cooking utensil, and means being provided for introducing water, an oil or other substance into the chamber of the utensil between the inner and outer members thereof, whereby in the use of the cooking utensil over a flame or heating element of any kind or class, it will operate to prevent the burning or scorching of the food product or the like placed in the cooking utensil; and with these and other objects in view, the invention consists in a device of the class and for the purpose specified, which is simple in construction and efficient in use, and which is constructed as hereinafter described and claimed.

The invention is fully disclosed in the following specification of which the accompanying drawing forms a part, in which the separate parts of my improvement are designated by suitable reference characters in each of the views, and in which :—

The drawing shows a sectional perspective view of a frying pan made according to my invention.

In the drawing I have shown a frying pan made according to my invention and comprising inner and outer pan members 31 and 32 which are detachably connected, one with the other, by a threaded engagement of said parts as shown at 33 and the parts 31 and 32 are separated to form a chamber 34 therebetween, and the part 32 is provided with a handle member 35, which is preferably hollow and provided with an aperture 36 whereby water, oil or other suitable substance 37 may be passed into the chamber 34 through the hollow handle member 35 and through an aperture 38 in the member 32.

The member 31 of the frying pan is preferably provided at the top periphery portion thereof with a number of radially extending members 39 to facilitate the attachment and detachment of the separate members 31 and 32.

It is a very well known fact that in the use of frying pans, or other cooking utensils of this class, that food products unless carefully watched and treated are apt to be burned or scorched, which in many instances would destroy the food products, and the object of my invention is to provide utensils of the class specified and particularly frying pans which are composed of inner and outer members or parts, spaced one from the other to form a chamber therebetween, and placing a suitable substance in said chamber to form an insulation between the inner and outer members or parts of the utensil, whereby the outer member or part may be subjected to heating units of any kind or class customarily employed for cooking, frying or similar purposes and to transmit heat through the substance employed to the inner member or part to cook or fry a food product or the like in the inner member of the utensil, and yet prevent the possibilities of burning or scorching the same. It will also be understood that if the substance employed evaporates under heat, said substance may be replenished at will, whereby the chamber between the inner and outer members of the utensil may be kept substantially filled at all times when same is in use. It will be noted that by detachably connecting the inner and outer parts of a utensil of this class the separate members or parts thereof may be cleaned at will.

Having fully described my invention, what I claim as new and desire to secure by Letters Patent, is:—

1. A frying pan of the class described comprising a main pan member, a hollow handle mounted in connection with said pan member, the upper end portion of the pan member being internally threaded, a supplemental pan member of less dimensions than said first named pan member and adapted to be placed in and in threaded engagement with the main pan member, a flange on the supplemental pan member for limiting the inward movement thereof and to form between the separate pan members at the bottom and side walls thereof a space, and means for introducing a suitable substance into said space through the hollow handle of the main pan member.

2. A frying pan of the class described comprising a main pan member, a hollow handle mounted in connection with said pan member, the upper end portion of the pan member being internally threaded, a supplemental pan member of less dimensions than said first named pan member and adapted to be placed in and in threaded engagement with the main pan member, a flange on the supplemental pan member for limiting the inward movement thereof and to form between the separate pan members at the bottom and side walls thereof a space, means for introducing a suitable substance into said space through the hollow handle of the main pan member, and means on the supplemental pan member to facilitate the attachment and detachment thereof.

In testimony that I claim the foregoing as my invention I have signed my name this 19th day of March 1923.

BOZIDAR JANCIKIN.